DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 9

T922,001

PROCESS FOR TOPICALLY TREATING POLYESTER FIBER AND FABRICS WITH A DURABLE FLAME RETARDANT COMPOSITION

John Richard Schwier, 437 Kitty Lane, Cincinnati, Ohio 45328, and Kenneth Ray Barton, 201 Claymore Drive, Kingsport, Tenn. 37663

Filed Apr. 10, 1973, Ser. No. 349,889
**Int. Cl. C09k *3/28***
U.S. Cl. 117—136
No Drawing. 16 Pages Specification

Process in which polyester fiber or fabric is treated with aqueous solution containing tetrakis(hydroxymethyl)phosphonium halide, triazines and carbamic acid derivatives, dried, and then cured to produce a polymeric coating on the polyester surface. The polymeric coating is durable to severe washings and repeated dry cleanings and renders the polyester substantially flame retardant.